United States Patent
Read et al.

(10) Patent No.: US 9,720,314 B2
(45) Date of Patent: Aug. 1, 2017

(54) DUAL PROJECTION IN SHORT SCREEN DISTANCE

(71) Applicant: IMAX Corporation, Mississauga (CA)

(72) Inventors: Steven Charles Read, Mississauga (CA); John William Bowron, Burlington (CA)

(73) Assignee: IMAX Corporation, Ontario (CA)

( * ) Notice: Subject to any disclaimer, the term of this patent is extended or adjusted under 35 U.S.C. 154(b) by 0 days.

(21) Appl. No.: 14/784,303

(22) PCT Filed: Apr. 16, 2014

(86) PCT No.: PCT/IB2014/060774
§ 371 (c)(1),
(2) Date: Oct. 14, 2015

(87) PCT Pub. No.: WO2014/170845
PCT Pub. Date: Oct. 23, 2014

(65) Prior Publication Data
US 2016/0054648 A1 Feb. 25, 2016

Related U.S. Application Data

(60) Provisional application No. 61/812,330, filed on Apr. 16, 2013.

(51) Int. Cl.
*G03B 21/28* (2006.01)
*G03B 35/20* (2006.01)
(Continued)

(52) U.S. Cl.
CPC ............. *G03B 35/20* (2013.01); *G02B 13/16* (2013.01); *G02B 15/14* (2013.01); *G02B 27/26* (2013.01);
(Continued)

(58) Field of Classification Search
CPC .. G03B 21/28; G03B 21/208; G03B 21/2013; G03B 21/2053; G03B 35/18; G03B 35/20; G03B 35/26
See application file for complete search history.

(56) References Cited

U.S. PATENT DOCUMENTS 7,604,354 B1 10/2009 Ligon
7,857,455 B2 12/2010 Cowan et al.
(Continued)

FOREIGN PATENT DOCUMENTS

KR 101478443 1/2014

OTHER PUBLICATIONS

Christie Digital Systems, Inc., Christie Duo dual mirror integration kit, Christie-Visual Solutions, Christie Digital Systems USA, Inc., available online at: https://www.christiedigital.com/en-us/products/accessories/christie-duo-dual-mirror-integration-kit-108-448107-xx, Feb. 27, 2014, 2 pages.

(Continued)

*Primary Examiner* — Sultan Chowdhury
(74) *Attorney, Agent, or Firm* — Kilpatrick Townsend & Stockton LLP

(57) ABSTRACT

A theatre system is described that includes a screen and a projection system. The projection system includes a first mirror and a second mirror that are positionable within axes for imaged light and between projection lenses of projectors and the screen. The axes include a first axis and a second axis. The first mirror and the second mirror are configured for causing the first axis and the second axis to be parallel to each other and to have a displacement between the first axis and second axis along a dimension by which the screen is curved.

25 Claims, 4 Drawing Sheets

(51) Int. Cl.
G03B 35/26 (2006.01)
G03B 21/606 (2014.01)
H04N 13/04 (2006.01)
G02B 13/16 (2006.01)
G02B 15/14 (2006.01)
G02B 27/26 (2006.01)

(52) U.S. Cl.
CPC ........... *G03B 21/28* (2013.01); *G03B 21/606* (2013.01); *G03B 35/26* (2013.01); *H04N 13/0459* (2013.01)

(56) References Cited

U.S. PATENT DOCUMENTS

| | | | |
|---|---|---|---|
| 7,959,296 B2 | 6/2011 | Cowan et al. | |
| 2002/0011968 A1 | 1/2002 | Nishio et al. | |
| 2005/0264879 A1* | 12/2005 | Deter | G02B 13/16 359/451 |
| 2006/0152680 A1* | 7/2006 | Shibano | G03B 37/04 353/30 |
| 2010/0214540 A1* | 8/2010 | Sajadi | G03B 3/00 353/101 |
| 2011/0069282 A1* | 3/2011 | Kaneko | G02B 27/0972 353/52 |
| 2012/0188513 A1* | 7/2012 | Choi | H04N 9/3147 352/59 |
| 2012/0287360 A1 | 11/2012 | Sharp et al. | |
| 2013/0044367 A1* | 2/2013 | Lippey | G01N 21/65 359/327 |
| 2013/0107218 A1* | 5/2013 | Ebbesmeier | G02B 13/16 353/8 |
| 2013/0278904 A1 | 10/2013 | Schmidt | |

OTHER PUBLICATIONS

Christie Digital Systems, Inc., Christie Duo Frequently Asked Questions, Christie Digital Systems USA, Inc., Oct. 29, 2012, 6 pages.
Christie Digital Systems, Inc., Christie Duo Premium theaters Super-bright 2D and 3D presentations, Christie Digital Systems USA, Inc., 2013, 4 pages.
Christie Digital Systems, Inc., Christie Duo User Manual, Christie Digital Systems USA, Inc., Jun. 2013, 66 pages.
International Patent Application No. PCT/IB2014/060774, International Search Report and Written Opinion mailed Jul. 17, 2014, 8 pages.
European Application No. 14785808.8, Extended European Search Report mailed on Nov. 10, 2016, 9 pages.

* cited by examiner

DUAL PROJECTION IN SHORT SCREEN DISTANCE

CROSS-REFERENCE TO RELATED APPLICATIONS

This is a U.S. national phase under 35 U.S.C. 371 of International Patent Application No. PCT/IB2014/060774, titled "Dual Projection in Short Screen Distance" and filed Apr. 16, 2014, which claims the benefit of U.S. Provisional Application No. 61/812,330, titled "Dual Projection in Short Screen Distance" and filed Apr. 16, 2013, each of which is incorporated herein by reference in its entirety.

TECHNICAL FIELD

This disclosure relates to image projection in theatre environments and, more specifically, to dual projector systems a short distance from a screen.

BACKGROUND

Projection systems can have a single-lens projector that projects an image onto the front of a screen in a small auditorium environment or a room for small private viewing venues. The distance from the projector to the screen can be less than fifteen meters. For three-dimensional (3D) presentations, separately encoded left- and right-eye images are projected onto the same screen. The encoding of left- and right-eye images can reduce the light level in each image. Typically, screens with a high light-gain profile can be used instead of diffuse screens to direct more of the projected image light back to the audience. A viewer seated to view the presentation on a high-gain screen may view different luminance at different portions of the screen. Luminance refers to the light reflected from the screen to the viewer. Viewing a high-gain screen, the luminance at the center portion of the screen can be greater than the luminance at the peripheral portions of the screen. Systems and methods are desirable to increase the light levels in stereoscopic presentations to overcome the limitation of using a single projector with a screen that can be located a short distance from the projector.

SUMMARY

In one example, a theatre system is provided that includes a screen, a first projector, a first mirror, a second projector, and a second mirror. The screen has a horizontal dimension and a vertical dimension. One of the horizontal dimension or the vertical dimension is curved and another one of the horizontal dimension or the vertical dimension is straight. The first projector can output first imaged light. The first mirror is positioned between the first projector and the screen for directing the first imaged light along a first axis to the screen. The second projector can output second imaged light. The second mirror is positioned between the second projector and the screen for directing the second imaged light along a second axis to the screen. The first mirror and the second mirror are configured for causing the first axis and the second axis to be parallel to each other and to have a displacement between the first axis and the second axis along the same one of the horizontal dimension or the vertical dimension of the screen that is curved.

In another example, a theatre system is provided that includes a screen, a first projector, a second projector, a first mirror, and a second mirror. The screen has a surface with a gain to reflect light. The first projector can illuminate the screen with a first light having a first axis. The second projector can illuminate the screen with a second light having a second axis. The first mirror is positioned between the first projector and the screen. The second mirror is positioned between the second projector and the screen. The first mirror and the second mirror are configured to cause the first axis to be parallel to the second axis between (i) the first mirror and the second mirror and (ii) the screen, with a displacement between the first axis and the second axis. The screen includes an area positioned to have a luminance difference measured at a view location between the first light and the second light reflected from the screen, resulting from (i) the displacement between the first axis and the second axis and (ii) a difference in the gain for the first light and the second light incident on the area, to cause the area to reflect the light with the luminance difference between the first light and the second light. A curvature of the screen is along a dimension corresponding to the dimension of the displacement of the first axis and the second axis to cause the area with the luminance difference to shift away from a center of the screen.

In another example, a projection system is provided that includes a first mirror and a second mirror that are positionable within axes for imaged light and between projection lenses of projectors and a screen, the axes including a first axis and a second axis. The first mirror and the second mirror are configured for causing the first axis and the second axis to be parallel to each other and to have a displacement between the first axis and the second axis along a dimension by which the screen is curved.

In another example, a method is provided for use in a theatre system. First imaged light and second imaged light are projected. A first mirror directs the first imaged light along a first axis to a screen that is curved in one dimension. A second mirror directs the second imaged light along a second axis to the screen, the second axis being parallel to the first axis and defining a displacement with the first axis that is along the one dimension.

DETAILED DESCRIPTION

Certain aspects and features of the present disclosure relate to a projection system that can be positioned a short distance from a screen that is curved in at least one dimension. The projection system can include two projectors for outputting light with image information along two displaced axes onto the screen to provide a three-dimensional (3D), stereoscopic presentation. The projection system can also include optical mirrors positioned between the projectors and the screen. The optical mirrors can cause the axes of the projected imaged light information to have a reduced displacement, to be parallel, and to have a displacement along the same dimension in which the screen is curved to avoid or reduce image misalignment, keystone distortion, and luminance imbalance issues, while providing increased light levels in the stereoscopic presentation.

The spacing between the parallel axes of the projected imaged light to the screen from the two projectors can be reduced and may not be limited by widths of the projectors such that the screen can be positioned closer to the point of projection. For example, the short distance between the projection system and the screen can be a distance that is fifteen meters or less, rather than longer distances of twenty-five to thirty-two meters or more. The shortest distance may be five meters when using cinema type projectors, and one meter when using other types of projectors. Visual artifacts related to projecting two images onto the screen can become noticeable to the viewer when spacing between the axes of the projected imaged light to the screen becomes greater than six percent of the distance of the projector to the screen. In some examples, the screen can be a high-gain screen for directing a greater portion of image light toward the audience to improve image brightness. The projection system may be in a dual projector configuration and include two large commercial cinema projectors, such as IMAX™ cinema projectors.

In some examples, each projector includes a projection lens and an imaging device, such as a spatial light modulator. Examples of a spatial light modulator include a digital mirror device, a liquid crystal device, and liquid crystal on silicon device. The projection lens can be shifted, vertically or horizontally, with respect to the associated image device to further improve image alignment and avoid keystone distortion, at a pixel level or otherwise, that may otherwise introduce undesirable image artifacts.

Figure 1:
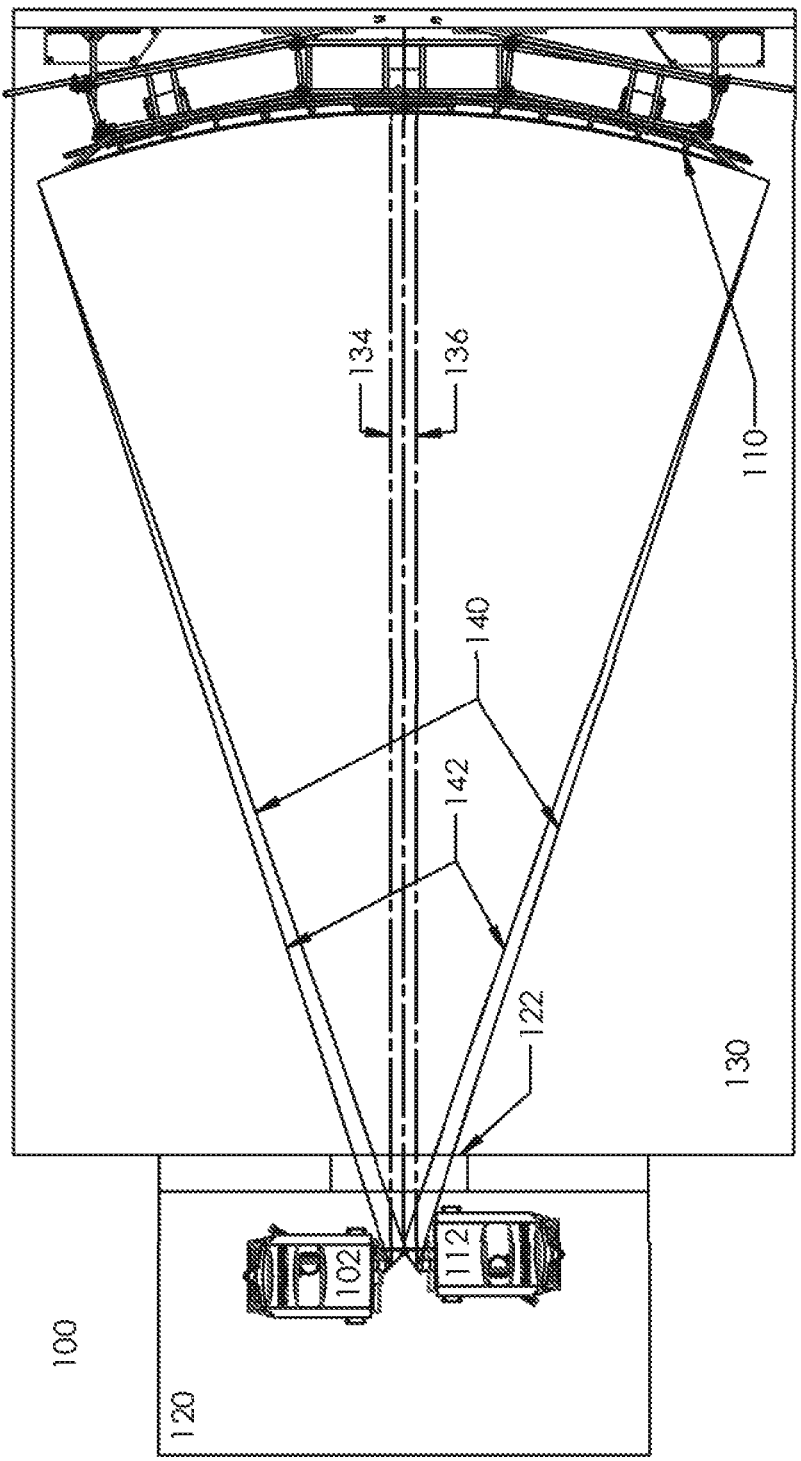
FIG. 1 is top view of a dual-projector theatre configuration according to one example.

FIG. 1 is a schematic diagram of a theatre configuration 100 according to one example. The theatre configuration 100 is a system that includes dual projectors 102, 112 that can each project an image onto a screen 110 positioned a shorter distance from the projection booth 120 as compared to the distance a projection booth with projectors would normally be positioned from a screen in a commercial cinema theatre. A short, projector-to-screen distance can be fifteen meters to one meter. The screen 110 can be a high-gain screen. The projection booth 120 can have a window 122 and the dual projectors 102, 112 can be positioned behind the window 122. The viewers that view the screen 110 can sit in the auditorium 130. The theatre configuration 100 may overcome keystone-distortion issues, spatial-offset issues between illumination distribution profiles of separately projected images, and luminance imbalance issues between projected images.

Lines represent the axis paths 134, 136 of the projected imaged light to the screen 110. A projection angle 140 is shown that is the projection angle of the image projected by projector 102. Another projection angle 142 is shown that is the projection angle of the image projected by projector 102. Any difference in overlap area that may appear on the screen can be masked out so that only the overlapped image area is shown on the screen.

The axis paths 134, 136 can be formed by an optical system that includes mirrors associated with the projectors 102, 112. The mirrors can direct light from the projectors 102, 112 so that the axis paths 134, 136 are parallel with each other toward the screen.

Figure 2:
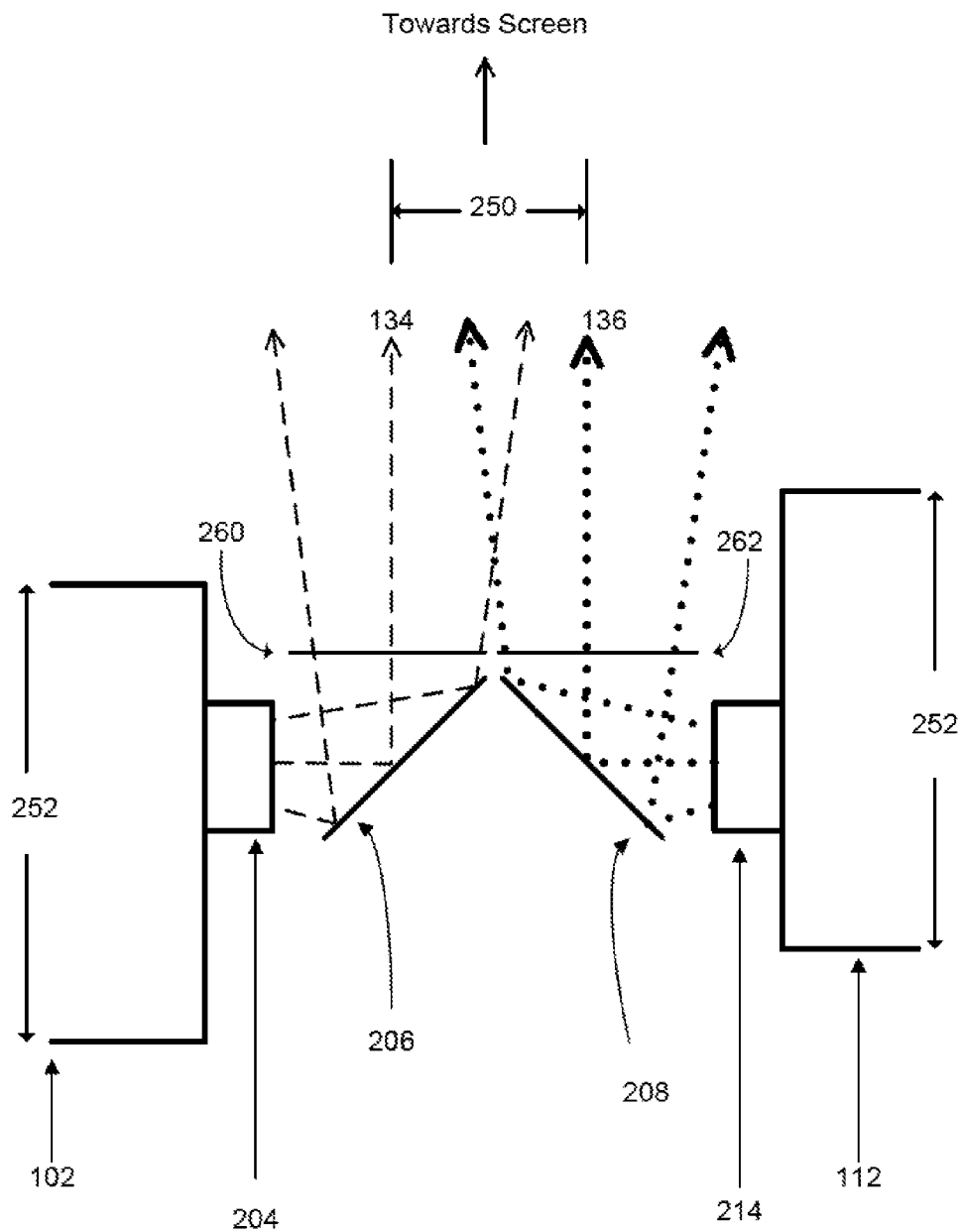
FIG. 2 is schematic diagram of two projectors and an optical system for causing a displacement of optical axes from the two projectors according to one example.

FIG. 2 is schematic view of the two projectors 102, 112 positioned relative to each other and an optical system that includes mirrors 206, 208 between the two projectors 102, 112. The mirrors 206, 208 may be optical mirrors. Projector 102 has a projection lens 204 and projector 112 has a projection lens 214. The two projectors 102, 112 can output images, such as a left-eye image and a right-eye image, toward the mirrors 206, 208 using the projection lenses 204, 214. Each of the projectors 102, 112 can have a width 252 that is the same, as in FIG. 2, or that is different than the width of the other projector. In the configuration shown in FIG. 2, the displacement 250 between the two axis paths 134, 136 of the projected imaged light toward the screen 110 can be reduced to less than the width 252 of a projector, or to be in a range of one percent to six percent of the distance between the screen 110 and projection lenses 204, 214, using the set of mirrors 206, 208 oriented to reflect the projected images to the screen. The displacement 250 between the two axis paths 134, 136 can be oriented along the same dimension as the dimension in which the screen is curved. For example, the displacement 250 can be in the horizontal dimension if the screen is curved in the horizontal dimension, and the displacement 250 can be in the vertical dimension if the screen is curved in the vertical dimension.

The mirrors 206, 208 can be positioned between both projection lenses 204, 214 such that mirror 206 reflects the image projected by projection lens 204 towards the screen and mirror 208 reflects the image projected by projection lens 214 towards the screen. The axis paths 134, 136 can be directed by the mirrors so the axis paths 134, 136 can be parallel with each other towards the screen. The axis paths 134, 136 are central paths by which projected imaged light travels between the mirrors 206, 208 and the screen. The mirrors 206, 208 can be positioned in a side-by-side, horizontal arrangement in front of the projection lenses 204, 214 that have a common vertical position. Adjustments in the mirrors 206, 208 can make the two axis paths 134, 136 parallel between the mirrors 206, 208 and the screen. Using the mirrors 206, 208 to redirect the imaged light from each of the projection lenses 204, 214 can reduce an amount of displacement between the axis paths 134, 136. The reduced amount of displacement between the axis paths 134, 136 can allow one or both projection lenses 204, 214 to shift a respective projected image on the screen by an amount that is within the range of shift that the projection lens is capable of accommodating. The projection lens shift can be the shift of the projection lens optical axis with respect the optical axis of the image device or image-modulating device for digital projection systems. A projection lens can accommodate lens shifting with respect to the imaging device optical axis without creating keystone distortion when the image area of the imaging device is within the object circle diameter of the projection lens. The object circle diameter is the diameter associated with the projection lens in which an image area associated with the imaging device can be shifted such that the projection lens can project the image area without, or with minimal, keystone distortion.

The mirrors 206, 208 can be fully adjustable so that the position and angles of each mirror can be fine-tuned to properly direct each projected image to the screen and to maintain the parallel relationship between the axis paths 134, 136 associated with each projection lens 204, 214 beyond the mirrors 206, 208 to the screen. In some implementations the mirrors 206, 208 are highly reflective, such that over 90% of the incident light is reflected. Such a mirror can be a front-coated, totally reflecting optical mirror.

If the system in FIG. 1 is configured for presenting 3D content with audience members using polarized glasses, the projected image can be polarized by placing a left-eye image-polarizing element and a right-eye polarizing element anywhere in the output path of the projection lens of the projectors 102, 112. For example as shown in FIG. 2, the left-eye image-polarizing element 260 can be positioned between the mirror 206 and the screen. The right-eye polarizing element 262 can be positioned between the mirror 208 and the screen. Polarizing the light before the left and right mirror can be problematic in that preserving polarization can be less effective for certain angles of incidence of projected light incident on the mirror. Any loss of polarization can be avoided by placing a polarizer between a mirror and the screen.

When high-gain screens are used, a viewer viewing the screen can experience a difference in the luminance between the viewed left-eye and right-eye images on the screen. The difference in luminance can be caused by a difference in the amount of reflected left-eye and right-eye image light from the screen for each corresponding left-eye and right-eye image pixel on the screen. When left-eye and right-eye image light is incident on the same point on the screen but with a different angle of incidence, the amount of light reflected to the viewer can be different. Depending on the angular relationship of the projected image light incident on the screen, the reflected image light from the screen to the viewer and the gain of the screen, there can be significant luminance differences experienced by the viewer between the viewed left-eye and right-eye image. The differences in luminance experienced by a viewer caused by a high-gain screen are shown by example in FIGS. 3-4.

Figure 3:
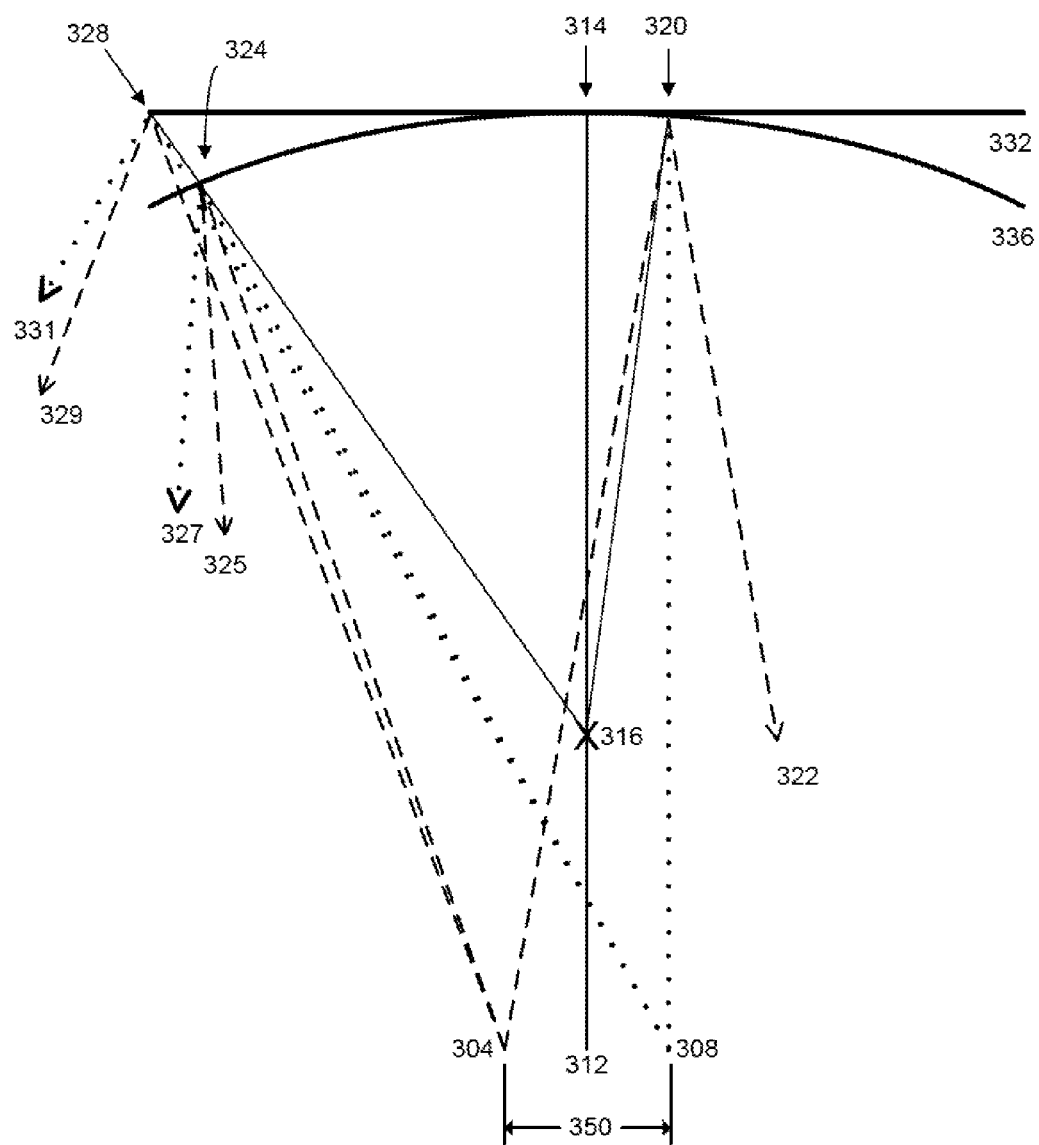
FIG. 3 is a schematic diagram of an overlay of two screens in a short-distance projection setup according to one example.

FIG. 3 schematically depicts a top view of an overlay of two screens (flat screen 332 and curved screen 336) in a short-distance projection setup, along with points and locations with respect to the screens. Specifically, FIG. 3 shows an overlay of an implementation using a flat screen 332 and a separate implementation using a curved screen 336 to illustrate angular relationships of image light projected from different points of projection onto a curved or flat screen being reflected to a viewer and being reflected in a direction with greatest luminance.

FIG. 3 depicts angles in a horizontal plane. But the vertical dimension can be included to account for the full angles of incidence and reflection. The two-dimensional depiction in FIG. 3 is for simplification purposes regarding the effect that a high gain screen has on luminance. Using the angular relationship described in FIG. 3 along with the reflective characteristics of the screen surface illustrated in gain versus viewing angle curve in FIG. 4, the luminance imbalance experienced by a viewer looking at a particular point on the screen can be described. FIG. 3 can also illustrate how curvature of the screen can be used to reposition areas of luminance imbalances that can occur while viewing left-eye and right-eye images. To emphasize curvature effects, the flat screen 332 in FIG. 3 can be considered as a screen with a curvature with infinite radius, and the curved screen 336 has a curvature with a radius in the order of the distance that the screen 332 is from a projector.

The setup is shown with respect to three projection points 304, 308, 312 in which a projection lens can be projecting an image onto the flat screen 332 or the curved screen 336. Point 304 can be the location at which the left-eye image is projected towards the screen from the projection booth. Point 308 can be the location at which the right-eye image is projected towards the screen from the projection booth. Point 312 can be the location at which an image or images are projected towards the screen along a centerline of the screen. The left-eye image and right-eye image projection points 304, 308 can be projection points for a projected left-eye image and a projected right-eye image for stereographic presentations. Point 312 can represent a projection point of a projector that can project both left-eye and right-eye images through the same projection lens, which can correspond with the center line of the screen. A viewer can be positioned between the point of projection and the screen as marked by a location 316.

For a 3D-projection system with a single projection lens projecting left-eye and right-eye images onto the screen, the left-eye and right-eye images, as seen by the viewer from any position in front of the screen, may not include a luminance imbalance between left-eye and right-eye images on the screen for any image position on the screen. For example, an image projected from point 312 along the screen's center line to the center of the screen at screen location 314 can be reflected back to 312 from the screen. A viewer at location 316 looking at an image on the screen at the screen location 314 may view maximum luminance according to a center position 412 of the gain curve 402 shown in FIG. 4. The angle between the viewer's line-of-sight of a spot on the screen (e.g., the line from screen location 314 to location 316) and the path of reflected light with maximum luminance from the spot on the screen (e.g., from screen location 314 to point 312) can be the viewing angle or gain-viewing angle. The viewing angle associated with the gain at center position 412 in FIG. 4 for this example is zero degrees. A viewer at location 316 that moves away from the reflected light path with the greatest luminance while viewing the screen location 314 can increase the viewing angle for the viewer. The viewed luminance, or perceived luminance, at screen location 314 can become less as the viewing angle increases. The perceived luminance for an increased viewing angle of reflected light projected from point 312 to screen location 314 can change based on the profile of the gain curve 402 in FIG. 4 and the viewing angle. Corresponding left-eye and right-eye image pixels projected by one projector on the screen can have the same gain-viewing angle, as described above. Without a difference in gain-viewing angle, the luminance imbalance between viewed left-eye and right-eye images on the screen may not occur as a result of screen gain.

Figure 4:
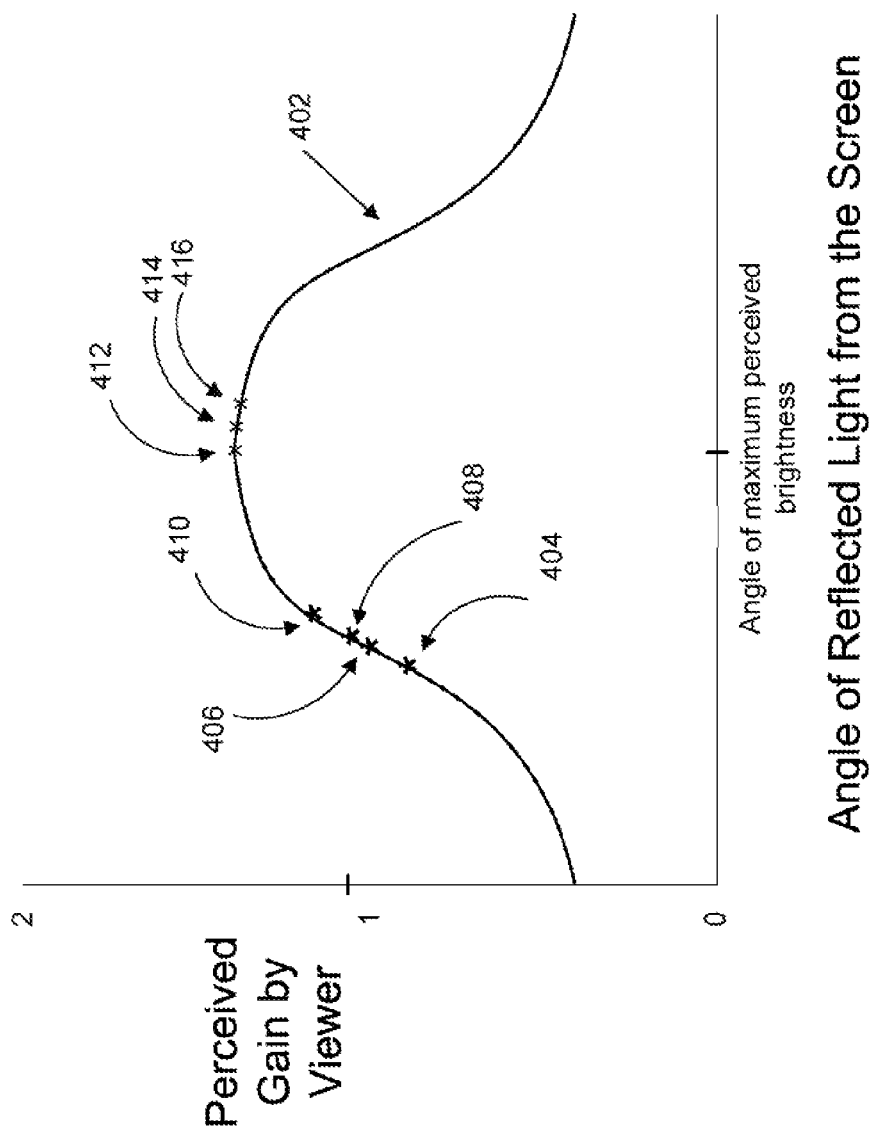
FIG. 4 is a chart that represents the change in screen gain as perceived by a viewer over a range of viewing angles according to one example.

FIG. 4 represents an example of the change in screen gain as perceived by a viewer over a range of viewing angles. In the example above, the light incident on the screen is normal to the screen (i.e., 90 degrees to the screen). The angle of reflection can be equal to the angle of incidence, and the luminance of the reflected light can be greatest along the path normal to the screen. Light can be incident on the screen at other angles and the light reflected in the specular direction, or equivalently at an angle equal to the angle of incidence, can be at or near the direction of maximum luminance. The gain associated with incident light that is not normal to the screen surface can still have a similar gain curve, as shown in FIG. 4, with the angle in FIG. 4 measured from the specular direction. For simplicity, the gain curve of FIG. 4 can be used for all incident angles of light on the flat screen 332 and curved screen 336 of FIG. 3. In FIG. 4, a gain curve value greater than one can indicate more light is reflected back to the viewer than would have been reflected back to the viewer if the screen had an ideal diffuse reflective surface (e.g., a Lambertian surface). A gain curve value less than one can indicate less light is reflected back to the viewer than would have been reflected back to the viewer if the screen had an ideal diffuse reflective surface.

For a 3D dual projector with a separate left-eye image and right-eye image projection lens, a viewer in FIG. 3 at location 316 can typically view screen location 320 where the left-eye image is being projected from the point 304 and the right-eye image is being projected from the point 308. Curved screen 336 for a screen location 320 near the center of the screen at screen location 314 can have a flat surface that reflects light in a manner similar to that of the flat screen 332 at the same or similar screen position of the flat screen 332. Gain-viewing angle performance near the center of the screen for curved and flat screens can be similar.

A left-eye image light ray from 304 can be reflected by the screen in the direction shown by arrow 322 such that the angle of incidence is equal to the angle of reflection. A viewer positioned at arrow 322 can view the maximum luminance of the left-eye image at screen location 320 when the image is projected from the 304. For example, the viewer can view a left-eye image from screen location 320 with a perceived gain such as that indicated by center position 412 in FIG. 4.

A viewer at location 316 can view the left-eye image at screen location 320 with a luminance related to the gain for the viewing angle between a line from location 316 to screen location 320 and a line from screen location 320 to an end of arrow 322. At location 316, the viewer may view a left-eye image gain at screen location 320 corresponding to position 416 on the gain curve 402 in FIG. 4.

The right-eye image projected from point 308 to screen location 320 can be at right angles to the flat screen 332 so the reflected light is directed back to point 308. The curved screen 336 at the screen location 320 has a similar angle of reflection as the flat screen 332 such that the light can be reflected in a similar direction as the flat screen 332. The viewer at location 316 can view the right-eye image at screen location 320 with a luminance related to the gain for the viewing angle between the line from location 316 to screen location 320 and the line from screen location 320 to point 308. At location 316, the viewer may view a right-eye image gain at screen location 320 corresponding to position 414 on the gain curve 402 in FIG. 4.

If the slopes of the gain curves at position 416 for the left-eye image and at position 414 for the right-eye image have small gain changes for a range of small viewing angles, the amount of luminance imbalance can be small. Small differences between the left-eye and right-eye image luminance viewed by a viewer's left and right eyes, respectively, can be acceptable since the eyes are able to adjust to this difference without experiencing discomfort or degraded viewing experience.

A viewer at location 316 that shifts from viewing an image at screen location 320 to a location towards the outer edge of the screen, such as screen location 324 or screen location 328, the difference in luminance between the viewed left-eye and right-eye images at screen location 324 or screen location 328 on the screen changes. If the screen is a flat screen 332 and the screen location 328 is being observed on the screen by a viewer at location 316, the gain-viewing angles of the left-eye and right-eye image at screen location 328 can be much larger than the gain-viewing angles of the left-eye and right-eye images at screen location 320 that is closer to the center of the screen.

For example, the left-eye image at the screen location 328 is shown with a light ray from point 304 to screen location 328 and reflecting off the screen with maximum luminance in the direction of arrowed line 329. The left-eye image gain-viewing angle can be the angle between a viewer's line-of-sight of screen location 328 (e.g., along a line from location 316 to screen location 328) and a line of the reflected light with maximum luminance along arrowed line 329. The gain associated with the left-eye image gain-viewing angle at screen location 328 for a viewer at location 316 can correspond to position 410 on the gain curve 402 in FIG. 4.

The right-eye image can be shown at the screen location 328 with a light ray from point 308 to the screen location 328. The light ray can reflect off the screen with maximum luminance in the direction of arrowed line 331. The right-eye image gain-viewing angle can be the angle between the viewer's line of sight of screen location 328 (i.e., a line from location 316 to screen location 328) and along arrowed line 331. The gain associated with the right-eye image gain-viewing angle at screen location 328 for a viewer at location 316 can correspond to position 404 on the gain curve 402 in FIG. 4. The left-eye and right-eye gain-viewing angles can be quite large, resulting in a significant reduction in eye image luminance.

Slopes of the gain curves at position 410 for the left-eye image and at position 404 for the right-eye image can be large, and changes in the gain of the viewing angle can be large for small changes in viewing angles. Small differences in left-eye and right-eye image gain-viewing angles can create large differences in luminance between the left-eye and right eye images being viewed. For these larger differences between the left-eye and right-eye image luminance for portions of the image viewed by a viewer's left and right eyes, respectively, may not be acceptable since the eyes may not able to adjust to this difference causing a degraded viewing experience. Viewing a left-eye and right-eye image luminance imbalance can appear on the screen in a portion of the screen where the difference of the gain-viewing angle of the left-eye and right eye image on the screen falls in the portion of the gain curve, such as in FIG. 4, where the magnitude of the slope of the gain curve is much larger.

Gain curves that have a flatter profile may not create as big a portion of luminance imbalance between the two viewed projected images where the axes of the projected imaged light to the screen is displaced. Gain curves with an accentuated profile where gain is significantly higher at smaller viewing angles than the gains at larger viewing angles may use a dual projection system where the displacement of the axes of the projected imaged light to the screen has a reduced displacement.

When left-eye and right-eye image projectors are placed side-by-side, a large displacement between the axes of the projected images towards the screen can cause large differences in gain-viewing angles between the left-eye and right-eye images viewed on the screen, which can have a gain as described above with position 404 and position 410 on the gain curve of FIG. 4.

If the same projectors in the side-by-side projector configuration are reconfigured as in FIGS. 1 and 2 with a mirror system positioned between the projectors, the difference of the left-eye and right-eye image gain-viewing angles can be reduced. Reducing the displacement between axes of the projected imaged light towards the screen by about two-thirds, for example, can result in a reduction in the difference in the gain-viewing angle for corresponding left-eye and right-eye image pixels projected onto the screen. When the difference in the gain-viewing angles are reduced between corresponding left-eye and right-eye image pixels, the difference in gain of the viewing angles can be less, and the luminance difference between the corresponding pixels on the screen can be less for viewed left-eye and right-eye images. Reducing the displacement between the left and right axes of projected imaged light towards the screen location 328 can cause the gain-viewing angle associated with the left-eye image (angle between a line from location 316 to screen location 328 and arrowed line 329) to increase such that the gain at position 410 can shift to a gain at position 408 on the gain curve 402 in FIG. 4 for the left-eye image. The gain-viewing angle associated with the right-eye image (angle between a line from location 316 to screen location 328 and along arrowed line 331) can decrease such that the gain at position 404 can shift to a gain at position 406 on the gain curve 402 in FIG. 4 for the right-eye image. Reducing the difference in left-eye and right-eye image gain-viewing angles can cause the difference in the gain of the viewing angles to be less.

In another example, the curvature of the screen, such as the curved screen 336, can be used to change the position of the area of the greatest luminance imbalance further from the screen center and away from where audiences tend to focus on the action of the presentation content. The screen curvature can affect the gain-viewing angle of the viewer.

The left-eye image on the curved screen 336 at the screen location 324 can be provided by a light ray from point 304 to screen location 324 and reflect off the curved screen 336 with maximum luminance in the direction of arrow 325. The left-eye gain-viewing angle can be the angle between the viewer's line-of-sight of screen location 324 (i.e., a line from location 316 to screen location 324) and the line in the direction of the arrow 325.

The right-eye image at the screen location 324 can be provided by a light ray from point 308 to screen location 324 and can reflect off the curved screen 336 with maximum luminance in the direction of arrow 327. The right-eye image gain-viewing angle can be the angle between the viewer's line-of-sight of screen location 324 (i.e., a line from location 316 to screen location 324) and the line in the direction of the arrow 327.

Comparing the gain-viewing angles for the left-eye and right-eye images on the curved screen 336 associated with screen location 324 to the gain-viewing angles for the left-eye and right-eye images on the flat screen 332 associated with screen location 328, the gain-viewing angles for the curved screen 336 are less than the gain-viewing angles for the flat screen 332 for corresponding flat and curved screen positions. Reducing the gain-viewing angles with respect to the viewer's position with more screen curvature can cause luminance experienced by the viewer with smaller gain-viewing angles to appear to be spread out further from the center of the screen. By increasing the curvature of the screen from a flat screen 332 to a curved screen 336, the positions 404, 406, 406, 410 previously described on the gain curve 402 for the flat screen 332 can shift towards center position 412, which can be the angle of maximum perceived brightness. The positions 414, 416 can shift towards position 412 as well. The effect of spreading out from screen center of the luminance experienced by the viewer by increasing the curvature of the screen can be used to shift the portions of luminance imbalance between viewed left-eye and right-eye images further from the center of the screen. The screen curvature can be determined based on the profile of the gain of the viewing angles for specific viewing positions to increase the maximum area at the center of the screen so that the maximum area at the center of the screen does not have unacceptable viewer luminance imbalance between left-eye and right-eye images.

If the screen is curved horizontally towards the viewer but is not curved vertically towards the viewer, it can be advantageous in dual projection systems to have the separation 350 of the axes of projected imaged light towards the screen oriented in the same direction as the curvature of the curved screen 336. By using the horizontal curved screen with horizontally displaced axes of projected imaged light towards the screen, it can be possible to use the curvature of the screen to reduce gain-viewing angles in the viewed left-eye and right-eye images on the screen in the horizontal direction compared to a screen surface that is horizontally flat. With no vertical displacement between the axes of projected left-eye and right-eye projected imaged light towards the screen, there may not be a difference in luminance in the vertical direction between the left-eye and right-eye images on the screen. Curving the screen vertically may not improve luminance imbalance in the vertical direction because there is no vertical luminance imbalance.

The screen gain can be selected such that the portion of the gain curve with a greater slope occurs at greater gain-viewing angles and the curved screen can be designed or adjusted to reduce the gain-viewing angles of the left-eye and right-eye images and shift the greater viewing angles with increased gain slope to occur at the peripheral portion of the screen or outside of the screen surface, which can be blocked by masking at the projector. The areas on the screen with differences in gain where gain slope is greatest in the gain-viewing angles of the reflected images, as viewed from a viewing location such as location 316 in FIG. 3, can be shifted away from screen center by designing or adjusting an amount by which the screen is curved and selecting the screen gain. In some examples, the screen can have a selected gain and can be curved by an amount such that the greatest slope in gain for gain-viewing angles of reflections of the left-eye imaged light and the right-eye imaged light occur at an edge of the screen. In other examples, the screen can have a selected gain and can be curved by an amount such that the greatest slope in gain for gain-viewing angles of reflections of the left-eye imaged light and the right-eye imaged light occur beyond an edge of the screen.

In another example of a dual projection system, the displacement between the axes of the projected imaged light towards the screen only occurs vertically, and the screen is curved vertically to shift the area of greatest luminance imbalance vertically outwards. Typically, the longer dimension of a screen, such as a cinema screen with a 1.85:1 or a 2.35:1 aspect ratio, is the horizontal dimension. With no horizontal displacement of the left-eye and right-eye projection axes towards the screen, there may be no area of luminance imbalance in the horizontal direction. The vertical dimension of the screen is typically shorter than the horizontal dimension and the luminance imbalanced area has a shorter distance to be shifted to the peripheral portion of the screen by controlling the curvature. In this configuration, the mirrors 206, 208 in FIG. 2 can be in an over-and-under configuration instead of a side-by-side configuration.

For example, FIG. 2 shows side-by-side mirrors horizontally displaced from each other. An alternate configuration for the mirrors can include positioning one mirror above the other such that the mirrors are vertically displaced. To project an image using the upper mirror, the projector associated with that mirror can be raised to a position so the projection lens is in line with the upper mirror. With the mirrors in this alternate configuration, the displacement between the axes of the projected imaged light towards the screen is vertical. The vertical dimension of the presentation format can be less than the horizontal dimension of the presentation format, such as in a format with a 2.35:1 aspect ratio or a format with a 1.85:1 aspect ratio. With a smaller vertical dimension, it can be possible to have a minimum separation between the axes of projected imaged light between the mirrors and screen that is less than when the mirrors are positioned horizontally with respect to each other. The screen can be curved vertically so the location on the screen of the difference of the left-eye and right-eye image gain-viewing angles that occur within the portion of the gain curve with a greater slope are positioned further away from the center portion of the screen to, potentially, being outside of the viewable screen area.

There can be situations in which the point of projection is above or below the center axis of the screen, which can cause some vertical keystone distortion. The center axis of the screen is the centerline normal to the screen surface at the center position of the screen. In a side-by-side mirror configuration, as in FIG. 2, any vertical keystone distortion of the two projectors can match each other. The vertical keystone distortion being matched can be different from the horizontal keystone distortion related to the convergence of the projected images, which is not matched. In matching the vertical keystone distortion, the image alignment can remain with more vertical keystone distortion. In matching the horizontal keystone distortion, image alignment can be divergent with more horizontal keystone distortion. If the projection lens can be shifted horizontally within the object circle diameter of the lens, there can also be additional margin within the object circle diameter of the lens to allow the lens to be vertically shifted to compensate or correct for all or a portion of the vertical keystone distortion.

A projection lens in some implementations as described herein can be a lens with zoom capability. The object circle diameter of the zoom lens can change based on the zoom position of the lens. In general, the wider the projection angle to which the zoom lens is set, the less the object circle diameter. There can be some tradeoff for zoom positions that have less projection angle but have a larger object circle diameter to allow for greater horizontal and vertical lens shift, for example, where a projection lens has zoom capability, and the object circle diameter is adjusted to match the required horizontal or vertical lens shift or both.

The distance from the point of projection to the screen for each projector can be the same. If one projection path is longer than the other projection path, the image with the longer projection path can appear to be magnified and appear to be larger on the screen relative to the image on the screen projected from the other projector. Any difference in image size on the screen between left-eye and right-eye image can be undesirable. Differences in path length can be addressed by changing the distance between the projector lens and the mirror. The projection lens may have some zoom capability in which any zoom adjustment can be used to compensate for any difference in the magnification of an image on the screen.

The mirrors as shown in FIG. 2 can be adjusted such that a true 90-degree relationship exists between the two reflective surfaces. When the mirrors are configured in this manner, the horizontal shift of the image on the screen can be performed by horizontally shifting the projection lens with respect to the associated imaging device. Likewise, the vertical shift of the image on the screen can be performed by vertically shifting the projection lens with respect to the associated imaging device. If further horizontal shift is required to achieve convergence of the projected images, then the 90-degree angle between the mirrors can be slightly increased. Another approach may be to change the horizontal angle of incidence of the projector lens optical axes with respect to the mirror for image convergence.

Further adjusting the vertical image position on the screen may not be able to be performed by adjusting the mirrors because of the geometrical configuration. Instead, the forward tilt of the projector with respect to the mirrors can be changed to increase the vertical shift of an image on the screen. Another approach that may be useful for smaller projection systems can include pivoting the projector and associated mirror about the projector lens optical axis to cause the image to shift vertically.

The following lists examples of certain aspects, features, or implementations of the disclosed subject matter.

EXAMPLE #1

A projection system configuration, comprising:
a first projector with a first width for outputting light having a first axis;
a first mirror positioned in the first axis;
a second projector with a second width for outputting light having a second axis; and
a second mirror positioned in the second axis,
wherein the first mirror and the second mirror are configured for causing the first axis and the second axis to be parallel to each other and to have a horizontal displacement between the first axis and second axis,
wherein the displacement between the first axis and the second axis is less than the first width or the second width.

EXAMPLE #2

A theatre system configuration, comprising:
a screen;
a first projector with a first width for outputting light towards the screen having a first axis;
a first mirror positioned in the first axis between the first projector and the screen;
a second projector with a second width for outputting light towards the screen having a second axis; and
a second mirror positioned in the second axis between the second projector and the screen,
wherein the first mirror and the second mirror are configured for causing the first axis and the second axis to be parallel to each other and to have a horizontal displacement between the first axis and second axis,
wherein the displacement between the first axis and the second axis is less than the first width or the second width.

EXAMPLE #3

A theatre system comprising:
a screen having a horizontal dimension and a vertical dimension, one of the horizontal dimension or the vertical dimension being curved and another one of the horizontal dimension or the vertical dimension being straight;
a first projector for outputting first imaged light;
a first mirror positioned between the first projector and the screen for directing the first imaged light along a first axis to the screen;
a second projector for outputting second imaged light; and
a second mirror positioned between the second projector and the screen for directing the second imaged light along a second axis to the screen,
wherein the first mirror and the second mirror are configured for causing the first axis and the second axis to be parallel to each other and to have a displacement between the first axis and the second axis along the same one of the horizontal dimension or the vertical dimension of the screen that is curved.

EXAMPLE #4

The theatre system of example #3, wherein the first projector includes a first projection lens for outputting the first imaged light, wherein the second projector includes a second projection lens for outputting the second imaged light.

EXAMPLE #5

The theatre system of example #4, wherein the screen is positioned a distance from the first projection lens and the second projection lens that is in a range of one meter to fifteen meters.

EXAMPLE #6

The theatre system of example #5, wherein the displacement is by an amount that is in a range of one percent to six percent of the distance between the screen and the first projection lens and the second projection lens.

EXAMPLE #7

The theatre system of example #5, wherein the displacement is based on an object circle diameter of the first projection lens or the second projection lens.

EXAMPLE #8

The theatre system of example #4, wherein the displacement is based on a first luminance distribution of the first imaged light from the first projector onto the screen at a view location matched spatially to a second luminance distribution of the second imaged light from the second projector onto the screen at the view location, the view location being between the screen and the first projector and the second projector.

EXAMPLE #9

The theatre system of example #4, wherein the first projection lens or the second projection lens has zoom capability.

EXAMPLE #10

The theatre system of example #3, wherein the screen is a high-gain screen.

EXAMPLE #11

The theatre system of example #3, wherein the screen is curved along the horizontal dimension.

EXAMPLE #12

The theatre system of example #3, wherein the first projector and the second projector are in a stereoscopic projection system, the theatre system further comprising:
a first polarizer of a first polarization positioned between the first mirror and the screen; and
a second polarizer of a second polarization positioned between the second mirror and the screen.

EXAMPLE #13

The theatre system of example #3, the displacement between the first axis and the second axis is less than a width of the first projector or the second projector.

EXAMPLE #14

The theatre system of example #3, wherein the screen is configured to have a gain and to be curved by an amount for reducing gain-viewing angles of reflections of the first imaged light and the second imaged light viewed at a position between the screen and the first projector and the second projector.

EXAMPLE #15

The theatre system of example #14, wherein the screen is configured to have the gain and to be curved by the amount such that the gain-viewing angles of reflections with a greatest gain slope of the first imaged light and the second imaged light occur at an edge of the screen.

EXAMPLE #16

The theatre system of example #14, wherein the screen is configured to have the gain and to be curved by the amount such that the gain-viewing angles of reflections with a greatest gain slope of the first imaged light and the second imaged light occur beyond an edge of the screen.

EXAMPLE #17

The theatre system of example #3, wherein the screen includes an area positioned to have a luminance difference measured at a view location between the first imaged light and the second imaged light reflected from the screen, resulting from (i) the displacement between the first axis and the second axis and (ii) a difference in a gain of the screen for the first imaged light and the second imaged light incident on the area, to cause the area to reflect light with the luminance difference between the first imaged light and the second imaged light,
wherein a curvature of the screen is along a dimension corresponding to the dimension of the displacement of the first axis and the second axis to cause the area with the luminance difference to shift away from a center of the screen.

EXAMPLE #18

A theatre system, comprising:
a screen with a surface having a gain to reflect light;
a first projector for illuminating the screen with a first light having a first axis;
a second projector for illuminating the screen with a second light having a second axis;
a first mirror positioned between the first projector and the screen; and
a second mirror positioned between the second projector and the screen,
wherein the first mirror and the second mirror are configured to cause the first axis to be parallel to the second axis between (i) the first mirror and the second mirror and (ii) the screen, with a displacement between the first axis and the second axis,
wherein the screen includes an area positioned to have a luminance difference measured at a view location between the first light and the second light reflected from the screen, resulting from (i) the displacement between the first axis and the second axis and (ii) a difference in the gain for the first light and the second light incident on the area, to cause the area to reflect the light with the luminance difference between the first light and the second light,
wherein a curvature of the screen is along a dimension corresponding to the dimension of the displacement of the first axis and the second axis to cause the area with the luminance difference to shift away from a center of the screen.

EXAMPLE #19

The theatre system of example #18, wherein the dimension is a horizontal dimension or a vertical dimension,
wherein the first mirror is positioned for directing the first light along the first axis to the screen and the second mirror is positioned for directing the second light along the second axis to the screen.

EXAMPLE #20

The theatre system of example #18, wherein the first projector includes a first projection lens for outputting the first light,
wherein the second projector includes a second projection lens for outputting the second light.

EXAMPLE #21

The theatre system of example #20, wherein the screen is positioned a distance from the first projection lens and the second projection lens that is in a range of one meter to fifteen meters.

EXAMPLE #22

The theatre system of example #21, wherein the displacement is by an amount that is in a range of one percent to six percent of the distance between the screen and the first projection lens and the second projection lens.

EXAMPLE #23

The theatre system of example #18, wherein the first projector and the second projector are in a stereoscopic projection system, the theatre system further comprising:
a first polarizer of a first polarization positioned between the first mirror and the screen; and
a second polarizer of a second polarization positioned between the second mirror and the screen.

EXAMPLE #24

A projection system, comprising:
a first mirror and a second mirror that are positionable within axes for imaged light and between projection lenses of projectors and a screen, the axes including a first axis and a second axis,
wherein the first mirror and the second mirror are configured for causing the first axis and the second axis to be parallel to each other and to have a displacement between the first axis and the second axis along a dimension by which the screen is curved.

EXAMPLE #25

The projection system of example #24, further comprising:
a first projector for outputting first imaged light to the first mirror for being directed along the first axis; and
a second projector for outputting second imaged light to the second mirror for being directed along the second axis.

EXAMPLE #26

The projection system of example #25, wherein the first projector includes a first projection lens and the second projector includes a second projection lens.

EXAMPLE #27

The projection system of example #26, wherein the projection system is positionable within a theatre system having the screen such that the first projection lens and the second projection lens are a distance from the screen that is within a range of one meter to fifteen meters.

EXAMPLE #28

The projection system of example #27, wherein the displacement is by an amount that is in a range of one percent to six percent of the distance between the screen and the first projection lens and the second projection lens.

EXAMPLE #29

The projection system of example #24, wherein the projection system is a stereoscopic projection system, the projection system further comprising:
a first polarizer of a first polarization configured for being positioned within the first axis; and
a second polarizer of a second polarization configured for being positioned within the second axis.

EXAMPLE #30

A method for use in a theatre system, comprising:
projecting first imaged light and second imaged light;
directing, by a first mirror, the first imaged light along a first axis to a screen that is curved in one dimension; and
directing, by a second mirror, the second imaged light along a second axis to the screen, the second axis being parallel to the first axis and defining a displacement with the first axis that is along the one dimension.

EXAMPLE #31

The method of example #30, wherein projecting the first imaged light and the second imaged light includes projecting the first imaged light and the second imaged light from projection lenses of separate projectors.

EXAMPLE #32

The method of example #31, wherein the screen is in a range of one meter to fifteen meters from the projection lenses.

EXAMPLE #33

The method of example #30, further comprising:
polarizing the first imaged light in the first axis and the second imaged light in the second axis.

EXAMPLE #34

The method of example #30, further comprising:
reflecting, by the screen, the first imaged light and the second imaged light to form reflected first imaged light and reflected second imaged light, the reflected first imaged light having a luminance difference with the reflected second imaged light.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A theatre system comprising:
a screen having a horizontal dimension and a vertical dimension, one of the horizontal dimension or the vertical dimension being curved and another one of the horizontal dimension or the vertical dimension being straight;
a first projector for outputting first imaged light;
a first mirror positioned between the first projector and the screen for directing the first imaged light along a first axis to the screen;
a second projector for outputting second imaged light; and
a second mirror positioned between the second projector and the screen for directing the second imaged light along a second axis to the screen,
wherein the first mirror and the second mirror are configured for causing the first axis and the second axis to be parallel to each other and to have a displacement between the first axis and the second axis along the same one of the horizontal dimension or the vertical dimension of the screen that is curved,
wherein the first projector includes a first projection lens for outputting the first imaged light,
wherein the second projector includes a second projection lens for outputting the second imaged light,
wherein the screen is positioned a distance from the first projection lens and the second projection lens that is in a range of one meter to fifteen meters.

2. The theatre system of claim 1, wherein the displacement is by an amount that is in a range of one percent to six percent of the distance between the screen and the first projection lens and the second projection lens.

3. The theatre system of claim 1, wherein the displacement is based on an object circle diameter of the first projection lens or the second projection lens.

4. The theatre system of claim 1, wherein the displacement is based on a first luminance distribution of the first imaged light from the first projector onto the screen at a view location matched spatially to a second luminance distribution of the second imaged light from the second projector onto the screen at the view location, the view location being between the screen and the first projector and the second projector.

5. The theatre system of claim 1, wherein the first projection lens or the second projection lens has zoom capability.

6. The theatre system of claim 1, wherein the screen is a high-gain screen.

7. The theatre system of claim 1, wherein the screen is curved along the horizontal dimension.

8. The theatre system of claim 1, wherein the first projector and the second projector are in a stereoscopic projection system, the theatre system further comprising:
a first polarizer of a first polarization positioned between the first mirror and the screen; and
a second polarizer of a second polarization positioned between the second mirror and the screen.

9. The theatre system of claim 1, wherein the displacement between the first axis and the second axis is less than a width of the first projector or the second projector.

10. The theatre system of claim 1, wherein the screen is configured to have a gain and to be curved by an amount for reducing gain-viewing angles of reflections of the first imaged light and the second imaged light viewed at a position between the screen and the first projector and the second projector.

11. The theatre system of claim 10, wherein the screen is configured to have the gain and to be curved by the amount such that the gain-viewing angles of reflections with a greatest gain slope of the first imaged light and the second imaged light occur at an edge of the screen.

12. The theatre system of claim 10, wherein the screen is configured to have the gain and to be curved by the amount such that the gain-viewing angles of reflections with a greatest gain slope of the first imaged light and the second imaged light occur beyond an edge of the screen.

13. A theatre system comprising:
a screen having a horizontal dimension and a vertical dimension, one of the horizontal dimension or the vertical dimension being curved and another one of the horizontal dimension or the vertical dimension being straight;
a first projector for outputting first imaged light;
a first mirror positioned between the first projector and the screen for directing the first imaged light along a first axis to the screen;
a second projector for outputting second imaged light; and
a second mirror positioned between the second projector and the screen for directing the second imaged light along a second axis to the screen,
wherein the first mirror and the second mirror are configured for causing the first axis and the second axis to be parallel to each other and to have a displacement between the first axis and the second axis along the same one of the horizontal dimension or the vertical dimension of the screen that is curved,
wherein the screen includes an area positioned to have a luminance difference measured at a view location between the first imaged light and the second imaged light reflected from the screen, resulting from (i) the displacement between the first axis and the second axis and (ii) a difference in a gain of the screen for the first imaged light and the second imaged light incident on the area, to cause the area to reflect light with the luminance difference between the first imaged light and the second imaged light,
wherein a curvature of the screen is along a dimension corresponding to the dimension of the displacement of the first axis and the second axis to cause the area with the luminance difference to shift away from a center of the screen.

14. A theatre system, comprising:
a screen with a surface having a gain to reflect light;
a first projector for illuminating the screen with a first light having a first axis;
a second projector for illuminating the screen with a second light having a second axis;
a first mirror positioned between the first projector and the screen; and
a second mirror positioned between the second projector and the screen,
wherein the first mirror and the second mirror are configured to cause the first axis to be parallel to the second axis between (i) the first mirror and the second mirror and (ii) the screen, with a displacement between the first axis and the second axis, wherein the screen includes an area positioned to have a luminance difference measured at a view location between the first light and the second light reflected from the screen, resulting from (i) the displacement between the first axis and the second axis and (ii) a difference in the gain for the first light and the second light incident on the area, to cause the area to reflect the light with the luminance difference between the first light and the second light, wherein a curvature of the screen is along a dimension corresponding to the dimension of the displacement of the first axis and the second axis to cause the area with the luminance difference to shift away from a center of the screen.

15. The theatre system of claim 14, wherein the dimension is a horizontal dimension or a vertical dimension, wherein the first mirror is positioned for directing the first light along the first axis to the screen and the second mirror is positioned for directing the second light along the second axis to the screen.

16. The theatre system of claim 14, wherein the first projector includes a first projection lens for outputting the first light, wherein the second projector includes a second projection lens for outputting the second light.

17. The theatre system of claim 16, wherein the screen is positioned a distance from the first projection lens and the second projection lens that is in a range of one meter to fifteen meters.

18. The theatre system of claim 17, wherein the displacement is by an amount that is in a range of one percent to six percent of the distance between the screen and the first projection lens and the second projection lens.

19. The theatre system of claim 14, wherein the first projector and the second projector are in a stereoscopic projection system, the theatre system further comprising:

a first polarizer of a first polarization positioned between the first mirror and the screen; and a second polarizer of a second polarization positioned between the second mirror and the screen.

20. A projection system, comprising:

a first mirror and a second mirror that are positionable within axes for imaged light and between projection lenses of projectors and a screen, the axes including a first axis and a second axis;

a first projector for outputting first imaged light to the first mirror for being directed along the first axis, the first projector including a first projection lens; and a second projector for outputting second imaged light to the second mirror for being directed along the second axis, the second projector including a second projection lens, wherein the first mirror and the second mirror are configured for causing the first axis and the second axis to be parallel to each other and to have a displacement between the first axis and the second axis along a dimension by which the screen is curved, wherein the projection system is positionable within a theatre system having the screen such that the first projection lens and the second projection lens are a distance from the screen that is within a range of one meter to fifteen meters.

21. The projection system of claim 20, wherein the displacement is by an amount that is in a range of one percent to six percent of the distance between the screen and the first projection lens and the second projection lens.

22. The projection system of claim 20, wherein the projection system is a stereoscopic projection system, the projection system further comprising:

a first polarizer of a first polarization configured for being positioned within the first axis; and a second polarizer of a second polarization configured for being positioned within the second axis.

23. A method for use in a theatre system, comprising:

projecting first imaged light and second imaged light by projecting the first imaged light and the second imaged light from projection lenses of separate projectors;

directing, by a first mirror, the first imaged light along a first axis to a screen that is curved in one dimension; and directing, by a second mirror, the second imaged light along a second axis to the screen, the second axis being parallel to the first axis and defining a displacement with the first axis that is along the one dimension, wherein the screen is in a range of one meter to fifteen meters from the projection lenses.

24. The method of claim 23, further comprising: polarizing the first imaged light in the first axis and the second imaged light in the second axis.

25. The method of claim 23, further comprising:

reflecting, by the screen, the first imaged light and the second imaged light to form reflected first imaged light and reflected second imaged light, the reflected first imaged light having a luminance difference with the reflected second imaged light.

* * * * *